United States Patent
Harjuhahto et al.

(10) Patent No.: US 11,852,594 B2
(45) Date of Patent: Dec. 26, 2023

(54) SURFACE SCANNER, AN ARRANGEMENT AND A METHOD FOR SURFACE DEFECT DETECTION OF A CABLE

(71) Applicant: Maillefer S.A., Ecublens (CH)

(72) Inventors: Janne Harjuhahto, Vantaa (FI); Jaakko Harjuhahto, Porvoo (FI)

(73) Assignee: Maillefer S.A., Ecublens (CH)

( * ) Notice: Subject to any disclaimer, the term of this patent is extended or adjusted under 35 U.S.C. 154(b) by 749 days.

(21) Appl. No.: 16/977,154

(22) PCT Filed: Apr. 11, 2019

(86) PCT No.: PCT/EP2019/059249
§ 371 (c)(1),
(2) Date: Sep. 1, 2020

(87) PCT Pub. No.: WO2019/197530
PCT Pub. Date: Oct. 17, 2019

(65) Prior Publication Data
US 2021/0041375 A1 Feb. 11, 2021

(30) Foreign Application Priority Data

Apr. 13, 2018 (FI) .................................... 20185355

(51) Int. Cl.
*G01N 21/952* (2006.01)
*G01B 11/02* (2006.01)
(Continued)

(52) U.S. Cl.
CPC ......... *G01N 21/952* (2013.01); *G01B 11/026* (2013.01); *G01B 11/2408* (2013.01);
(Continued)

(58) Field of Classification Search
CPC .................. G01N 21/952; G01N 3/08; G01N 2201/06113; G01B 11/026;
(Continued)

(56) References Cited

U.S. PATENT DOCUMENTS 4,988,875 A * 1/1991 Ortiz .................... G01N 21/952
250/559.46
2010/0132910 A1* 6/2010 Rosenthal .............. G01B 21/30
164/451
(Continued)

FOREIGN PATENT DOCUMENTS

CN 101533689 A 9/2009
CN 101657277 A * 2/2010 ............. B21B 37/00
(Continued)

OTHER PUBLICATIONS

The China National Intellectual Property Administration First Notification of Office Action, Application No. 2019800185028, dated Jul. 2, 2021.
(Continued)

*Primary Examiner* — Michael J Dalbo
*Assistant Examiner* — Kaleria Knox
(74) *Attorney, Agent, or Firm* — MacMillan, Sobanski & Todd, LLC

(57) ABSTRACT

A surface scanner for surface defect detection of a cable comprises a measuring part and an analysis part, the measuring part comprises non-contact distance measurement sensors, the cable is positionable between the sensors such that beams of the sensors are directable to the outer surface of the cable to sample areas at a circumference of the cable for a length of the outer surface (L) of the cable in a run direction (x) of the cable for providing measurement data, and the analysis part comprises a receiver for the measurement data, a processor for processing the measurement data
(Continued)

providing defect detection data and a continuous 3D topographic map of the outer surface of the cable, the analysis part comprising a neural network trained for detecting surface defects of the cable and outputting surface defects detection data. The invention also relates to an arrangement and a method for surface defect detection of a cable.

10 Claims, 3 Drawing Sheets

(51) Int. Cl.
- G01B 11/24 (2006.01)
- G01B 11/30 (2006.01)
- G06N 3/08 (2023.01)
- H01B 13/14 (2006.01)
- H01B 13/24 (2006.01)

(52) U.S. Cl.
CPC .......... *G01B 11/303* (2013.01); *G01B 11/306* (2013.01); *G06N 3/08* (2013.01); *H01B 13/14* (2013.01); *H01B 13/24* (2013.01); *G01N 2201/06113* (2013.01)

(58) Field of Classification Search
CPC . G01B 11/2408; G01B 11/303; G01B 11/306; H01B 13/14; H01B 13/24
See application file for complete search history.

(56) References Cited

U.S. PATENT DOCUMENTS

| | | | |
|---|---|---|---|
| 2014/0183365 A1 | 7/2014 | Kyriakis | |
| 2015/0300810 A1* | 10/2015 | Fojtík | ............... G01B 11/2408 356/635 |
| 2016/0258740 A1 | 9/2016 | Matsumoto et al. | |

FOREIGN PATENT DOCUMENTS

| | | | | |
|---|---|---|---|---|
| CN | 101657277 A | | 2/2010 | |
| CN | 205542172 U | | 8/2016 | |
| CN | 205984452 U | * | 2/2017 | |
| CN | 205984452 U | | 2/2017 | |
| CN | 106531353 A | | 3/2017 | |
| DE | 3414500 C2 | | 9/1993 | |
| EP | 0692697 A2 | | 1/1996 | |
| GB | 2138562 A | * | 10/1984 | ............ B29C 47/92 |
| GB | 2138562 A | | 10/1984 | |
| JP | 2001033233 A | | 2/2001 | |
| JP | 2018147803 A | | 9/2018 | |
| WO | 2015189466 A1 | | 12/2015 | |

OTHER PUBLICATIONS

Lahti, M. Topography Scanner—Art and science around digital quality measurement. [online], Mar. 13, 2018, [retrieved on Nov. 7, 2018]. Retrieved from <https://blog.maillefer.net/blog/topography-scanner-art-and-science-around-digital-quality-measurement>, entire document.

* cited by examiner

SURFACE SCANNER, AN ARRANGEMENT AND A METHOD FOR SURFACE DEFECT DETECTION OF A CABLE

PRIORITY

This application is a U.S. national application of the international application number PCT/EP2019/059249 filed on Apr. 11, 2019, which claims priority of Finnish application FI20185355 filed on Apr. 13, 2018, the contents of all of which are incorporated herein by reference.

FIELD OF THE INVENTION

The present invention relates to a surface scanner, an arrangement and a method for surface defect detection of a cable as recited in the preambles of the attached independent claims.

BACKGROUND OF THE INVENTION

Quality control and meeting the product specifications are very important in power cable production. For instance, high voltage cables are used for long length connections for power distribution and power transmission. A failure due to dielectric breakdown in the high voltage power cable causes a break to power supply.

Power cables are manufactured in cable manufacturing lines using extrusion. The manufacturing quality is monitored during the operation of the cable manufacturing line to assure the quality of the end product. It is known to use X-ray systems, which are adapted to measure the depth of different layers inside the cable as well as the eccentricity of the conductor inside the insulation. The existing X-ray systems, however, are complicated systems where a typical X-ray system comprises several components like an X-ray tube, a high voltage generator, a chiller and an image capture device. X-ray systems are capable of measuring averaged layer depths but do not provide detailed information of the quality of the extruded surface. Therefore, there is a need for a device capable of continuous monitoring of the quality of the extruded surface, i.e. capable of monitoring the surface of the cable for defects and detect the defects automatically.

BRIEF DESCRIPTION OF THE INVENTION

An object of the present invention to provide a surface scanner, an arrangement and a method to overcome the above problems. The objects of the invention are achieved by a surface scanner, an arrangement and a method which are characterized by what is stated in the independent claims. The preferred embodiments of the invention are disclosed in the dependent claims.

The surface scanner for surface defect detection of a cable comprises a measuring part and an analysis part, the measuring part comprises at least one support part and non-contact distance measurement sensors, the sensors comprising laser displacement sensors being arranged to the support part, the cable being positionable between the sensors such that beams of the sensors are directable to the outer surface of the cable to sample areas at a circumference of the cable for a length of the outer surface of the cable in a run direction of the cable for providing measurement data, and the analysis part comprises a receiver for the measurement data and a processor for processing the measurement data providing defect detection data, wherein the beams of the non-contact distance measurement sensors are directable to cover the total circumference of the cable and the sensors being arranged to calculate the distance to the outer surface of the cable by focusing light reflected from the outer surface of the cable on the receiver which comprises a light-receiving element wherein the processor is configured to create a continuous 3D topographic map of the outer surface of the cable, and wherein the analysis part comprises a neural network trained for detecting surface defects of the cable and outputting surface defects detection data of the cable.

The arrangement for surface defect detection of a cable comprises the surface scanner, and a cable manufacturing line comprising a payoff, an extrusion arrangement and a take up, wherein the surface scanner is installed in the cable manufacturing line to a position between the payoff and the take up such that the cable is guidable from the payoff to the take up through the measuring part of the surface scanner.

Preferred embodiments of the arrangement are presented in the attached dependent claims.

The method for detecting surface defects of a cable comprises a surface scanner, in the method the cable is manufactured in a cable manufacturing line wherein the cable is unwinded at a payoff, the cable is provided with one or more layers of extrusion in an extrusion arrangement, the cable is winded at a take up, and the surface scanner is positioned between the payoff and the take up, and the cable is travelling through the measuring part of the surface scanner at run speed of the cable manufacturing line, wherein the beams of the non-contact distance measurement sensors are directed to the outer surface of the cable to sample areas covering the total circumference of the cable for a length of the outer surface of the cable in a run direction of the cable, the non-contact distance measurement sensors calculating the distance to the outer surface of the cable and providing measurement data, the receiver of the analysis part is receiving the measurement data and the processor is processing the measurement data and creates thereof a continuous 3D topographic map of the outer surface of the cable, said 3D topographic map providing defect detection data from the cable, and the trained neural network of the analysis part is detecting surface defects of the cable and outputs surface defect detection data of the cable.

Preferred embodiments of the method are presented in the attached dependent claims.

An advantage of the surface scanner, the arrangement and the method of the invention is that they are capable of continuous monitoring of the quality of the extruded surface, i.e. capable of monitoring the surface of the cable for defects and detect the defects automatically.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
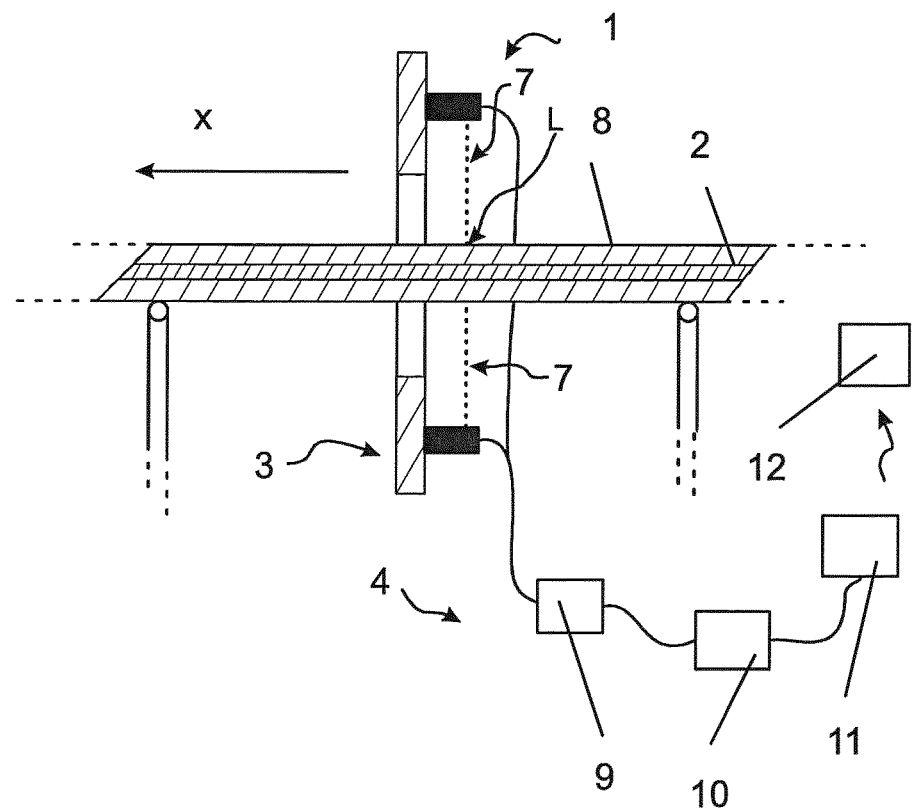
FIG. 1 shows a side view of a surface scanner.

FIG. 1 shows a side view of a surface scanner 1 for surface defect detection of a cable 2. The scanner 1, which can be called a 3D surface scanner, comprises a measuring part 3 and an analysis part 4. The measuring part 3 comprises at least one support part 5 and non-contact distance measurement sensors 6. The non-contact distance measurement sensors 6 are arranged to the support part 5. The cable 2 to be inspected is positionable between the non-contact distance measurement sensors 6 such that beams 7 of the sensors are directable to the outer surface 8 of the cable 2 to sample areas 22. The sample areas 22 are at a circumference of the cable 2 for a length L of the outer surface 8 of the cable in a run direction x of the cable. The length of the beam in the run direction x of cable 2 is a thin plane. The beams 7 of non-contact distance measurement sensors 6 provide measurement data. The analysis part 4 comprises a receiver 9 for the measurement data and a processor 10 for processing the measurement data providing defect detection data.

The 3D surface scanner 1 detects defects, which are detectable from the outer surface 8 of a cable 2. The 3D surface scanner 1 measures the difference of levels on the outer surface 8 of the cable 2 providing measuring values. The 3D surface scanner 1 is able to detect defects and provide accurate dimension of the detected defects, e.g. the width, the length and the depth of the defect. Thus, the 3D surface scanner 1 inspects the shape of the outer surface 8 of the cable 2. The 3D surface scanner is able to provide a detailed description of the shape of the cable, the diameter of the cable 2 and their variation. The output of the 3D surface scanner 1, the defect detection data, can be used to control the cable manufacturing process.

An example of a serious defect in a cable 2 is a scorch caused by premature crosslinking creating gel particles, i.e. cluster(s) of oxidized polymer. The cross-linked gels in a melt create a rough surface on the cable. Thus, a defect in the outer surface 8 of the cable 2 reveals defects inside the cable. A scorch is an example of a defect generated during the manufacturing of a cable 2. Defects can be generated also during the transport of the cable 2 between different stages of the cable manufacturing. For instance, a cable comprising an insulated conductor is manufactured in a vulcanization line and then transported to a degassing process wherefrom it is transported to a cable sheathing line. Examples of different defects on an outer surface a cable 2 are incision, bumps and dents.

The 3D surface scanner is also able to detect properties of the outer surface 22 of a cable 2. An example of a property is a die line formed to the cable 2 serving a purpose.

The 3D surface scanner may also calculate physical magnitudes and quality metrics from the measurement data and from the detected defect data.

Compared to existing X-rays systems used in cable manufacturing the 3D surface scanner 1 provides an accurate monitoring of the geometry of the outer surface 8 of a cable 2. X-ray systems are adapted to measure the depth of different layers inside the cable as well as the eccentricity of the conductor inside the insulation. Thus, the 3D surface 1 scanner and a X-ray system are applicable to a same cable manufacturing line.

In an embodiment, the non-contact distance measurement sensors 6 comprise laser displacement sensors. In a laser displacement sensor, a laser beam emitted from a laser is applied to the outer surface 8 of the cable 2. The light reflected from the outer surface 8 of the cable 2 is collected by a receiver lens and focused on a light-receiving element. The method used is laser triangulation where the laser displacement sensor calculates the distance to the outer surface 8 of the cable 2 by focusing the light reflected from the outer surface of the cable on the light-receiving element.

Figure 2:
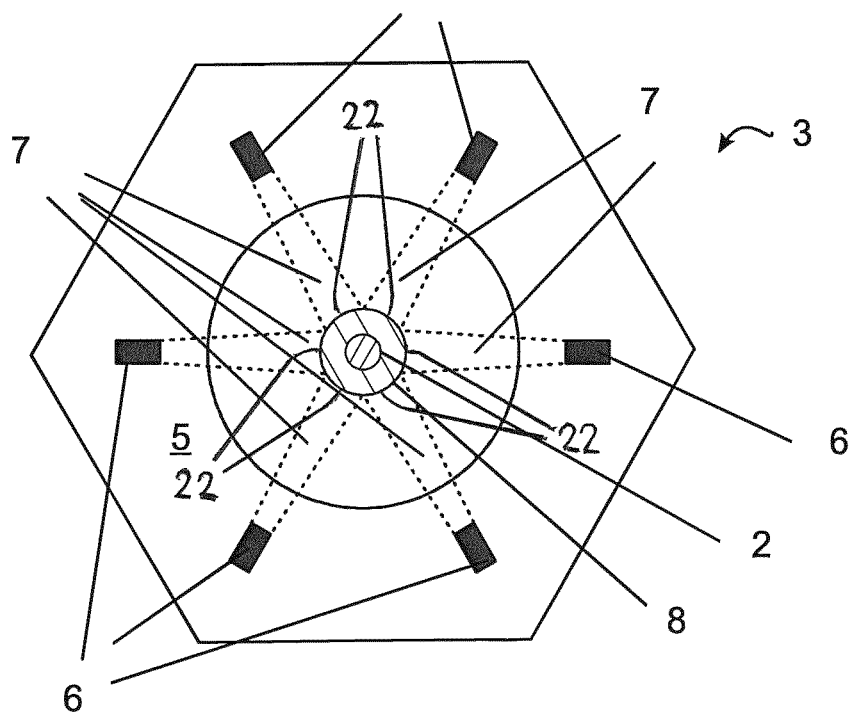
FIG. 2 shows a front view of a measuring part of a surface scanner.

In another embodiment, the non-contact distance measurement sensors 6 are arranged in a ring. In FIG. 2 the sensors 6 are arranged with substantially even intervals. By arranging the sample areas 22 are at a circumference of the cable 2 to cover substantially the total circumference and using a high measuring frequency (50 . . . 20000 Hz) a detailed measurement data from the outer surface 8 of the cable 2 can be obtained.

In a further embodiment, the processor 10 is configured to create a topographic map of the outer surface 8 of the cable 2. The topographic map discloses the measurement data, e.g. the difference of levels on the outer surface 8 of the cable 2, by means of colours or contour lines together with lengthwise and radial position data. A topographic map presents visually technical information of the cable 2.

In a yet further embodiment, the analysis part 4 comprises a transmitter 11 for transmitting the processed data and/or the defect detection data to a cloud storage 12. Computerized maintenance management systems for preventive maintenance or the equipment manufacturer for production optimization may access the processed data and/or the defect detection data in a local storage or in a cloud storage 12, for instance. Further, the stored processed data and/or the defect detection data can be transmitted to an end customer as an evidence of the cable quality via a cloud storage 12.

In a yet another further embodiment, the processor 10 is configured to calculate waviness, ovality and/or flatness of the cable 2. Waviness, ovality and flatness of the cable 2 are parameters that describe the quality of the production. Constant and accurate monitoring of the geometry discloses gradual changes in the outer surface quality of the cable 2. Gradual increase in flatness, ovality or diameter variations can indicate a need for certain maintenance during the production, or before the next production run at the latest.

The analysis part 4 of the 3D surface scanner 1 comprises a neural network for detecting defects from the processed measurement data. The processor 10 of analysis part 4 or a separate transmitter can transmit the processed measurement data to the neural network of the analysis part 4. The neural network is trained to output the presence or absence a defect. The trained neural network outputs defect detection data. The defect detection data may comprise also a conclusion determined from defect detection data.

Neural networks are capable of learning complicated nonlinear relationships from sets of training examples. In supervised training both the inputs and outputs are provided. In unsupervised training, the network is provided with inputs but not with desired outputs. In unsupervised training, the neural network learns from the measurement data acquired during a run of a cable 2 production process. Thus, the neural network of the analysis part 4 is able to recognize a defect from measured data. The neural network is advantageous over a rule-based defect detection system as there are multiple types of defects in the outer surface 8 of a cable 2 with varying geometries that are hard to define beforehand with only analytical rules.

An arrangement for surface defect detection of a cable comprises a 3D surface scanner 1. The arrangement comprises a cable manufacturing line 13, 14 comprising a payoff 15, an extrusion arrangement 16 and a take up 17, wherein the 3D surface scanner 1 is installed in the cable manufacturing line 13, 14 to a position between the payoff 15 and the take up 17 such that the cable 2 is guidable from the payoff 15 to the take up 17 through the measuring part 3 of the 3D surface scanner 1.

The positioning of the 3D surface scanner in the cable manufacturing line depends on a function the 3D surface scanner is serving. The 3D surface scanner can inspect the resulting cable of the cable manufacturing line, or the 3D surface scanner can inspect the cable entering the cable manufacturing line. When the 3D surface scanner is detecting defects in a fresh outer surface of a cable it is advantageous to install the 3D surface scanner to a position where the cable temperature has decreased to a temperature where plastic deformation of the cable do not occur.

Examples of applicable cable manufacturing lines are core insulation, sheathing, silane, silicone and rubber continuous vulcanization lines.

The extrusion arrangement 16 may comprise one or more extruders capable of extruding one or more layers of extrusions. The layers of extrusion can be formed in steps or simultaneously using one or more extrusion heads.

Figure 3:
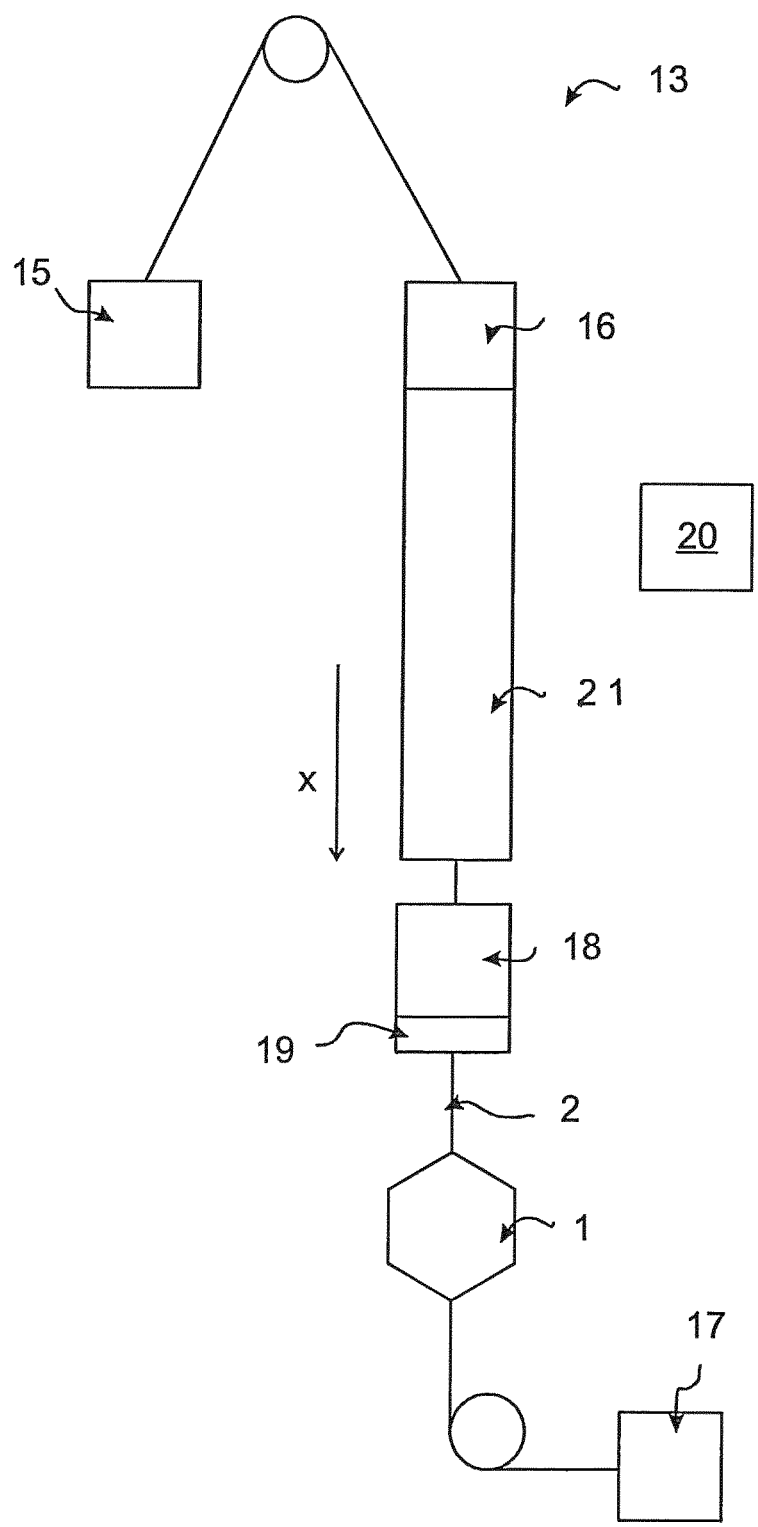
FIG. 3 shows an arrangement for surface defect detection of a cable.

In an embodiment, the arrangement comprises a continuous vulcanization line 13. A continuous vulcanization line 13 is an example of a cable manufacturing line producing an insulated conductor type of cable. Chemical crosslinking of cables is called vulcanization and can be accomplished by a reaction between the polymers and a crosslinking agent by means of heat induction. Most commonly XLPE material, cross linkable polyethylene, is used for the insulation of cable 2. FIG. 3 shows a principle layout of a vulcanizing line 13, especially a vertical continuous vulcanization line. The line shown comprises a payoff 15, an extrusion arrangement 16, a vulcanization tube 21, a cooling section 18 and a take up 17. The extrusion arrangement 16 provides one or more layers of extrusions to the conductor. Vulcanization is performed by passing the insulated conductor through a long pressurized tube, which is heated by steam or nitrogen, for instance. The conductor is guided from the payoff 15 to the take up 17 through the vulcanization line 13. FIG. 3 shows only the most basic elements of the line. The vulcanization line 13 may also comprise further elements, e.g. a preheater for a conductor element, a post heater, and metering capstans or metering caterpillars. The continuous vulcanization line 13 comprises a cooling section 18 arranged after the extrusion arrangement 16 in the run direction x of the cable 2 wherein the 3D surface scanner 1 is arranged after the cooling section 18 in the run direction x of the cable 2.

Further, the cooling section may comprise a cooling tube and an end seal 19 sealing the cooling tube wherein the 3D surface scanner 1 is arranged after the end seal 19 in the run direction x of the cable 2.

Figure 4:
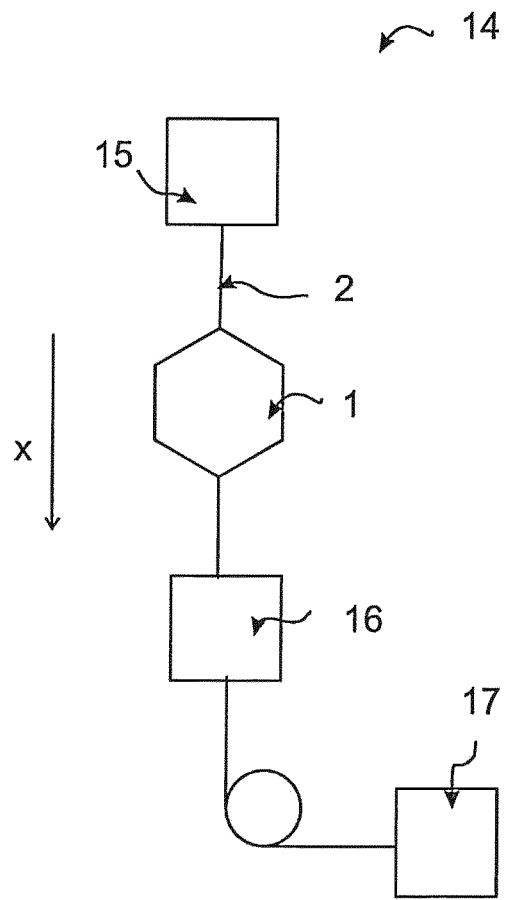
FIG. 4 shows an arrangement for surface defect detection of a cable.

In another embodiment, the cable manufacturing line comprises a cable sheathing line 14. The cable sheathing line 14 shown in FIG. 4 comprises a payoff 15 in front of the extrusion arrangement 16 in the run direction of the cable wherein the 3D surface scanner 1 is positioned between the payoff 15 and the extrusion arrangement 16 in the run direction x of the cable 2. The target of the defect detection in the forward end of the cable manufacturing line 14 is to ensure that the cable 2 to be sheathed fulfils the quality requirements before the sheathing is started. The quality inspection saves manufacturing costs as the sheathing can be interrupted if the cable 2 to be sheathed contains serious defects.

In a further embodiment, the analysis part 4 of the 3D surface scanner 1 comprises means for transmitting processed data and/or defect detection data to a process supervision unit 20 controlling the cable manufacturing line 13, 14. The process supervision unit 20 controlling the cable manufacturing line is able to change process parameters of the cable manufacturing line based on data of detected defects. Examples of the process parameters are revolutions of the extruder arrangement, insulation layer thickness, temperature of the crosslinking zone and a temperature profile in the extrusion arrangement. Additionally, the defect detection data containing certain types of defects can indicate a choking or a failure of a component of the cable manufacturing line. Depending on the defect type, the operator can then take immediate action to fix the issue causing defects or stop the cable manufacturing line to avoid generating unnecessary scrap.

A method for detecting surface defects of a cable comprises a 3D surface scanner 1. In the method the cable 2 is manufactured in a cable manufacturing line 13, 14 wherein the cable 2 is unwinded at a payoff 15, the cable is provided with one or more layers of extrusion in an extrusion arrangement 16 and the cable is winded at a take up 17. The 3D surface scanner 1 is positioned between the payoff 15 and the take up 17 and the cable 2 is travelling through the measuring part 3 of the 3D surface scanner 1 at run speed of the cable manufacturing line 13, 14. Beams 7 of non-contact distance measurement sensors 6 are directed to the outer surface 8 of the cable 2 to sample areas 22 at a circumference of the cable for a length of the outer surface L of the cable 2 in a run direction x of the cable 2. The non-contact distance measurement sensors 6 are providing measurement data, and the receiver 9 of the analysis part 4 is receiving the measurement data and the processor 10 is processing the measurement data providing defect detection data.

In an embodiment, in the method the analysis part 4 of the 3D surface scanner 1 is transmitting processed data and/or defect detection data to a process supervision unit 20 controlling the cable manufacturing line.

In another embodiment, in the method a process supervision unit 20 controlling the cable manufacturing line 13, 14 is changing process parameters the cable manufacturing line 13, 14 based on data of detected defects.

In a further embodiment, in the method the cable production line is a continuous vulcanization line 13 or a cable sheathing line 14.

The invented 3D surface scanner 1, the arrangement and method for surface defect detection of a cable is applicable to a variety of cables 2. An example of cables is a high-voltage cable or extra high voltage cable which is a cable used for electric power transmission at high voltage. A cable manufactured in a continuous vulcanization line comprises a conductor and insulation. The conductor typically comprises copper or aluminum. The insulation comprises typically three layers of extrusion: a conductor shield, a cross-linked polyethylene insulation and a cable shield. The layers are often coextruded simultaneously. After the cross-linking, the insulation has byproducts throughout its thickness. To ensure the cable has the correct properties a degassing process is required before cable sheathing. Typically, a high voltage cable or extra high voltage cable comprises a cable diameter up to 200 mm and a cable weight up to 80 kg/m.

The invented 3D surface scanner, the arrangement and method for surface defect detection of a cable allow the measuring extrusion process quality in real time. The invented 3D surface scanner and the arrangement for surface defect detection of a cable monitor continuously extrusion quality in a cable production. The invented 3D surface scanner, the arrangement and method for surface defect detection of a cable can provide a detailed measurement data from the outer surface of the cable. The invented 3D surface scanner and the arrangement for surface defect detection of a cable may also form a part of a quality assurance system in the cable manufacturing factory.

It will be obvious to a person skilled in the art that, as the technology advances, the inventive concept can be implemented in various ways. The invention and its embodiments are not limited to the examples described above but may vary within the scope of the claims.

The invention claimed is:

1. A surface scanner for surface defect detection of a cable, the scanner comprising a measuring part and an analysis part, the measuring part comprising at least one support part and non-contact distance measurement sensors, the sensors comprise laser displacement sensors being arranged to the support part, the cable being positionable between the sensors such that beams of the sensors are directable to the outer surface of the cable to sample areas at a circumference of the cable for a length (L) of the outer surface of the cable in a run direction (x) of the cable for providing measurement data, and the analysis part comprising a receiver for the measurement data and a processor for processing the measurement data providing defect detection data,
wherein the beams of the non-contact distance measurement sensors are directable to cover the total circumference of the cable and the sensors being arranged to calculate the distance to the outer surface of the cable by focusing light reflected from the outer surface of the cable on the receiver which comprises a light-receiving element, in that the processor is configured to create a continuous 3D topographic map of the outer surface of the cable, and in that the analysis part comprises a neural network trained for detecting surface defects of the cable and outputting surface defects detection data of the cable; and,
wherein the cable manufacturing line is a continuous vulcanization line producing an insulated conductor type of cable, and the continuous vulcanization line comprises a cooling section arranged after the extrusion arrangement in the run direction of the cable (x) wherein the surface scanner is positioned after the cooling section in the run direction (x) of the cable.

2. The surface scanner according to claim 1, wherein the non-contact distance measurement sensors are arranged in a ring with substantially even intervals.

3. The surface scanner according to claim 1, wherein the analysis part comprises a transmitter for transmitting the processed data and/or the defect detection data to a cloud storage.

4. The surface scanner according to claim 1, wherein the processor is configured to calculate waviness, ovality and/or flatness of the cable.

5. An arrangement for surface defect detection of a cable, wherein the arrangement comprises a surface scanner and a cable manufacturing line comprising a payoff,
wherein the scanner comprises a measuring part and an analysis part, the measuring part comprising at least one support part and non-contact distance measurement sensors, the sensors comprise laser displacement sensors being arranged to the support part, the cable being positionable between the sensors such that beams of the sensors are directable to the outer surface of the cable to sample areas at a circumference of the cable for a length (L) of the outer surface of the cable in a run direction (x) of the cable for providing measurement data, and the analysis part comprising a receiver for the measurement data and a processor for processing the measurement data providing defect detection data;
wherein the beams of the non-contact distance measurement sensors are, directable to cover the total circumference of the cable and the sensors being arranged to calculate the distance to the outer surface of the cable by focusing light reflected from the outer surface of the cable or the receiver which comprises a light-receiving element, in that the processor is configured to create a continuous 3D topographic map of the outer surface of the cable, and in that the analysis part comprises a neural network trained for detecting surface defects of the cable and outputting surface defects detection data of the cable; and,
wherein the cable manufacturing line is a continuous vulcanization line producing an insulated conductor type of cable, and the continuous vulcanization line comprises a cooling section arranged after the extrusion arrangement in the run direction of the cable (x) wherein the surface scanner is positioned after the cooling section in the run direction (x) of the cable; and,
an extrusion arrangement and a take up, wherein the surface scanner is installed in the cable manufacturing line to a position between the payoff and the take up such that the cable is guidable from the payoff to the take up through the measuring part of the surface scanner.

6. The arrangement for surface defect detection of a cable, according to claim 5, wherein the cooling section comprises a cooling tube and an end seal sealing the cooling tube wherein the surface scanner is positioned after the end seal in the run direction (x) of the cable.

7. The arrangement for surface defect detection of a cable, according to claim 6,
wherein the analysis part of the surface scanner comprises means for transmitting processed data and/or defect detection data to a process supervision unit controlling the cable manufacturing line.

8. The arrangement for surface defect detection of a cable, according to claim 5,
wherein the cable manufacturing line is a cable sheathing line, and the cable sheathing line comprises the payoff in front of the extrusion arrangement in the run direction (x) of the cable wherein the surface scanner is positioned between the payoff and the extrusion arrangement in the run direction (x) of the cable.

9. A method for detecting surface defects of a cable,
wherein the cable is manufactured in a cable manufacturing line wherein the cable is unwinded at a payoff, the cable is provided with one or more layers of extrusion in an extrusion arrangement,
the cable is winded at a take up,
and a surface scanner is positioned between the payoff and the take up, and the cable is travelling through the measuring part of a surface scanner at run speed of the cable manufacturing line,
wherein the scanner comprises a measuring part and an analysis part, the measuring part comprising at least one support part and non-contact distance measurement sensors, the sensors comprise laser displacement sensors being arranged to the support part, the cable being positionable between the sensors such that beams of the sensors are directable to the outer surface of the cable to sample areas at a circumference of the cable for a length (L) of the outer surface of the cable in a run direction (x) of the cable for providing measurement data, and the analysis part comprising a receiver for the measurement data and a processor for or processing the measurement data providing defect detection data,
wherein the beams of the non-contact distance measurement sensors are directable to cover the total circumference of the cable and the sensors being arranged to calculate the distance to the outer surface of the cable by focusing light reflected from the outer surface of the cable on the receiver which comprises a light-receiving element, in that the Processor is configured to create a continuous 3D topographic map of the outer surface of the cable, and in that the analysis part comprises a neural network trained for detecting surface defects oi the cable and outputting surface defects detection data of the cable;

wherein the beams of the non-contact distance measurement sensors are directed to the outer surface of the cable to sample areas covering the total circumference of the cable for a length (L) of the outer surface of the cable in a run direction (x) of the cable, wherein the analysis part of the surface scanner is transmitting processed data and/or defect detection data to a process supervision unit controlling the cable manufacturing line; and, wherein the process supervision unit controlling the cable manufacturing line is changing process parameters of the cable manufacturing line based on data of detected defects;

the non-contact distance measurement sensors calculating the distance to the outer surface of the cable and providing measurement data, the receiver of the analysis part is receiving the measurement data and the processor is processing the measurement data and creates thereof a continuous 3D topographic map of the outer surface of the cable, said 3D topographic map providing defect detection data from the cable, and the trained neural network of the analysis part is detecting surface defects of the cable and outputs surface defect detection data of the cable.

10. The method for detecting surface defects of a cable, according to claim 9, wherein the cable production line is a continuous vulcanization line or a cable sheathing line.

* * * * *